United States Patent
James

(10) Patent No.: US 9,806,908 B2
(45) Date of Patent: Oct. 31, 2017

(54) ROUTE MAPPING AT INDIVIDUAL NODES OF A CLUSTER SERVER

(71) Applicant: Advanced Micro Devices, Inc., Sunnyvale, CA (US)

(72) Inventor: Michael E. James, Sunnyvale, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 175 days.

(21) Appl. No.: 14/620,342

(22) Filed: Feb. 12, 2015

(65) Prior Publication Data

US 2015/0334010 A1 Nov. 19, 2015

(51) Int. Cl.
*H04L 12/28* (2006.01)
*H04L 12/64* (2006.01)

(52) U.S. Cl.
CPC ................ *H04L 12/6418* (2013.01)

(58) Field of Classification Search
CPC .......... H04L 45/02; H04L 45/04; H04L 45/10
See application file for complete search history.

(56) References Cited

U.S. PATENT DOCUMENTS

| | | | | |
|---|---|---|---|---|
| 6,633,544 B1 * | 10/2003 | Rexford | .................. | H04L 45/10 370/238 |
| 7,774,579 B1 * | 8/2010 | Wentzlaff | ............ | G06F 15/8007 712/11 |
| 2003/0081598 A1 * | 5/2003 | Bresniker | ............... | H04L 49/15 370/386 |
| 2005/0041665 A1 * | 2/2005 | Weyman | ................. | H04L 45/04 370/390 |
| 2007/0038767 A1 * | 2/2007 | Miles | ....................... | H04L 45/22 709/230 |
| 2010/0238944 A1 * | 9/2010 | Ajima | ............... | G06F 15/17368 370/401 |
| 2011/0075564 A1 * | 3/2011 | Wung | ................. | H04L 41/5054 370/237 |
| 2014/0040526 A1 * | 2/2014 | Chang | ............... | G06F 15/17331 710/316 |

* cited by examiner

*Primary Examiner* — Siren Wei

(57) ABSTRACT

Each compute node of a cluster compute server generates and maintains route information for routing messages to other nodes of the server. Each compute node identifies the other nodes connected to a fabric interconnect and generates, based on a set of routing constraints, routes to each of the other nodes. Each compute node communicates messages to other nodes of the server via the generated routes. Because the routes are generated at each compute node the processing load to generate the routes is distributed among the compute nodes.

17 Claims, 9 Drawing Sheets

ROUTE MAPPING AT INDIVIDUAL NODES OF A CLUSTER SERVER

BACKGROUND

Field of the Disclosure

The present disclosure relates generally to processing systems and more particularly to rout mapping at a cluster server.

Description of the Related Art

High performance computing systems, such as server systems, are sometimes implemented using compute nodes connected together by one or more fabric interconnects. The compute nodes execute software programs to perform designated services, such as file management, database management, document printing management, web page storage and presentation, computer game services, and the like, or a combination thereof. The multiple compute nodes facilitate the processing of relatively large amounts of data while also facilitating straightforward build-up and scaling of the computing system. The fabric interconnects provide a backbone for communication between the compute nodes, and therefore can have a significant impact on processor performance. A management node calculates routes between the nodes along the fabric interconnect and the compute nodes communicate messages to each other via the calculated routes.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Figure 1:
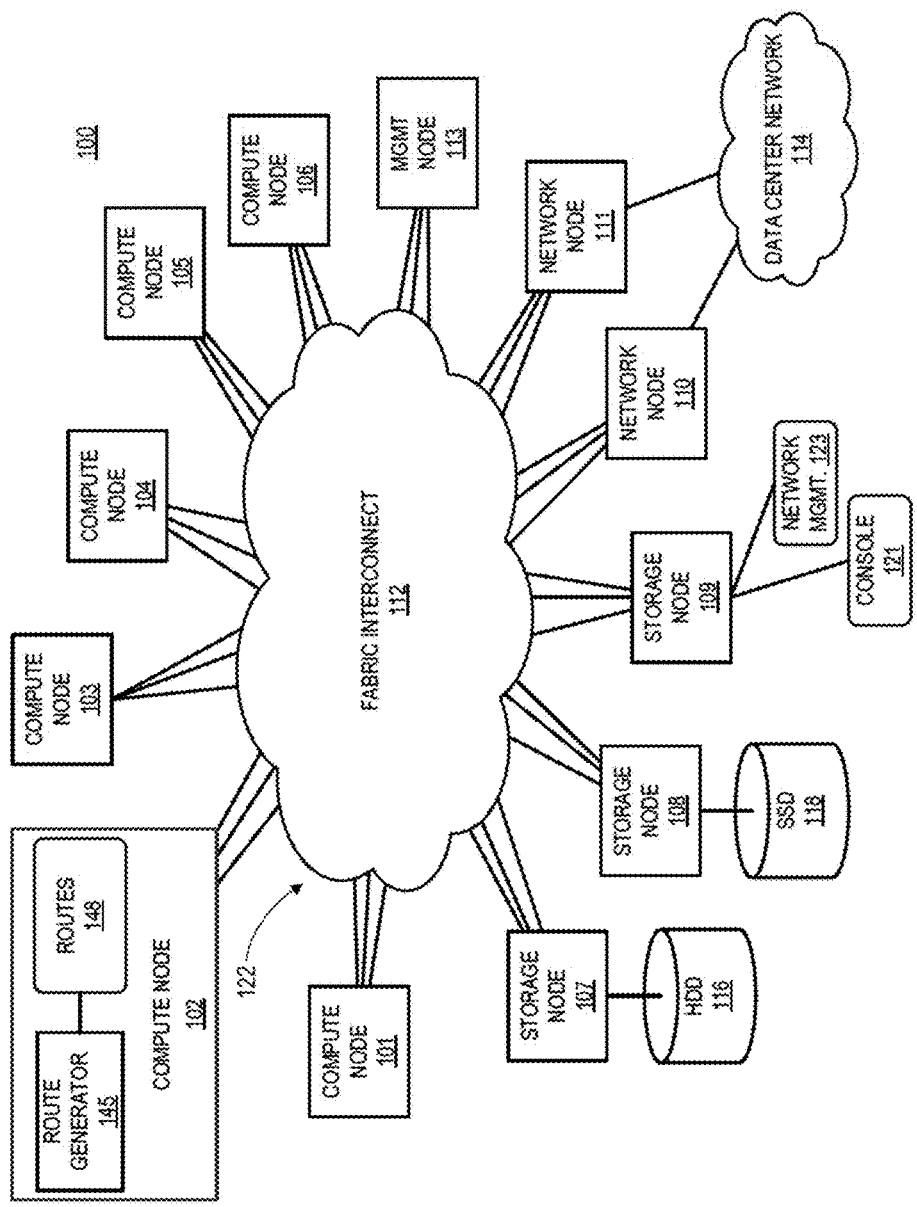
FIG. 1 is a block diagram of a cluster compute server in accordance with some embodiments.

FIGS. 1-12 illustrate techniques for generating and maintaining, at each compute node of a cluster compute server, route information for routing messages to other nodes of the server. Each compute node identifies the other nodes connected to a fabric interconnect and generates, based on a set of routing constraints, routes to each of the other nodes. Each compute node communicates messages to other nodes of the server via the generated routes. Because the routes are generated at each compute node, rather than at a centralized management node, the processing load to generate the routes is distributed among the compute nodes, thereby reducing the time required to generate the routes.

In some scenarios, a compute node may identify another node of the server system as unreachable. As used herein, an unreachable node, with respect to a given compute node, is a node of the server that is identified as not being reachable based on a set of routing constraints used to route messages between the server nodes. For example, as described further herein, the set of routing constraints for the server can include dimensional-ordered routing, wherein messages must first traverse the fabric interconnect fully in one plane before proceeding along another plane. However, an error or other characteristic of a link in the fabric interconnect may cause a node to be unreachable from the given compute node under the dimensional-ordered routing constraints. In response to identifying a node as unreachable, the given compute node identifies at least one intermediate node, wherein the intermediate node is reachable under the routing constraints, and the unreachable node (with respect to the given compute node) is reachable from the intermediate node under the routing constraints. The compute node identifies a route to the unreachable node via the intermediate node, and routes subsequent messages to the unreachable node via the intermediate node along the identified route.

Because the intermediate node is identified at the individual compute node, rather than at a central management node, the time required to identify routes at the server is reduced. Further, in some embodiments the intermediate node can be identified by a dedicated circuit that can identify the intermediate node using a relatively small number of calculations. This allows the server to quickly and flexibly respond to scenarios where nodes become unreachable. To illustrate, in some scenarios an error in the fabric interconnect causes a node to become unreachable from a plurality of compute nodes. In a conventional server, a management node would need to generate new routes to the unreachable node from each of the plurality of compute nodes. In contrast, using the techniques described herein, each of the plurality of compute nodes generates its own route to the unreachable node via one or more intermediate nodes. The processing load to generate the routes to the unreachable node is thus distributed among the plurality of compute nodes, reducing the amount of time needed to generate the new routes. Further, in some embodiments each compute node identifies the routes using a model of the server that models each compute node of the server in a corresponding hardware module. This allows each compute node to identify the reachability of different nodes in parallel, thereby further reducing the amount of time needed to identify routes.

FIG. 1 illustrates a cluster compute server 100 in accordance with some embodiments. The cluster compute server 100, referred to herein as "server 100", comprises a data center platform that brings together, in a rack unit (RU) system, computation, storage, switching, and server management. The server 100 is based on a parallel array of independent low power compute nodes (e.g., compute nodes 101-106), storage nodes (e.g., storage nodes 107-109), network nodes (e.g., network nodes 110 and 111), and management nodes (e.g., management node 113) linked together by a fabric interconnect 112, which comprises a high-bandwidth, low-latency supercomputer interconnect. Each node is implemented as a separate field replaceable unit (FRU) comprising components disposed at a printed circuit board (PCB)-based card or blade so as to facilitate efficient build-up, scaling, maintenance, repair, and hot swap capabilities.

The fabric interface device of the compute nodes, the fabric interfaces of the I/O nodes, and the fabric interconnect 112 together operate as a fabric 122 connecting the computing resources of the compute nodes with the peripheral resources of the I/O nodes. To this end, the fabric 122 implements a distributed switching facility whereby each of the fabric interfaces and fabric interface devices comprises multiple ports connected to bidirectional links of the fabric interconnect 112 and, after configuration of the fabric interconnect 112 in response to a system reset, operate as link layer switches to route packet traffic among the ports in accordance with deterministic routing logic implemented at the nodes of the server 100. Note that the term "link layer" generally refers to the data link layer, or layer 2, of the Open System Interconnection (OSI) model.

The fabric interconnect 112 can include a fixed or flexible interconnect such as a backplane, a printed wiring board, a motherboard, cabling or other flexible wiring, or a combination thereof. Moreover, the fabric interconnect 112 can include electrical signaling, photonic signaling, or a combination thereof. In some embodiments, the links of the fabric interconnect 112 comprise high-speed bi-directional serial links implemented in accordance with one or more of a Peripheral Component Interconnect-Express (PCIe) standard, a Rapid IO standard, a Rocket IO standard, a HyperTransport standard, a FiberChannel standard, an Ethernet-based standard, such as a Gigabit Ethernet (GbE) Attachment Unit Interface (XAUI) standard, and the like.

Although the FRUs implementing the nodes typically are physically arranged in one or more rows in a server box as described below, the fabric 122 can, during bootstrap or other configuration, logically arrange the nodes in any of a variety of mesh topologies or other network topologies, such as a torus, a multi-dimensional torus (also referred to as a k-ary n-cube), a tree, a fat tree, and the like. For purposes of illustration, the server 100 is described herein in the context of a multi-dimensional torus network topology. However, the described techniques may be similarly applied in other network topologies using the guidelines provided herein.

In some embodiments, allowing messages to be routed over the fabric interconnect 112 in any arbitrary route can lead to communication errors, such as loops, deadlocks, congestion issues, and the like. Accordingly, in some embodiments communication routes over the fabric interconnect 112 are governed by a set of specified routing constraints that reflect the routing scheme for the fabric interconnect 112. The routing constraints are a set of rules that any routes (e.g., routes to communicate messages) over the fabric interconnect 112 must comply with. For example, in some embodiments the fabric interconnect 112 is governed by dimensional-order routing constraints, wherein any message to be communicated must completely traverse the fabric interconnect 112 in one dimension before proceeding along another dimension. An example of dimensional-ordered routing is set forth below with respect to FIG. 2. For purposes of description, it is assumed that the fabric interconnect 112 is governed by dimensional-order routing constraints. However, it will be appreciated that the techniques described herein can be applied to other types and classes of routing constraints.

In operation, each of the compute nodes 101-106 generates and maintains a set of routes to each other node of the server 100. For example, compute node 102 includes a route generator 145 that generates and maintains routes 148, which indicate routes through the fabric interconnect to each of the compute nodes 101, 103, 104, 105, and 106, and can also include routes to each of the storage nodes 107-109 and each of the network nodes 110 and 111. Each of the compute nodes 101 and 103-106 include similar route generators and routes to each of the other nodes.

In some embodiments, in response to a system reset or other event, each of the compute nodes 101-106 periodically sends loopback messages to its connected nodes via corresponding links of the fabric interconnect 112 to determine if each link is operational. The loopback messages can also be sent in response to specified system events, such as a system reset. In response to identifying that a link is not operational, the corresponding compute node sends a message to each of the other compute nodes indicating the non-operational nature of the link. Each of the compute nodes then generates its set of routes, under the specified routing constraints, to each other node based on which links are operational.

To illustrate, in some embodiments the topology of the fabric interconnect 112 is such that the compute node 102 can identify a route to each other node under the dimensional-ordered routing constraints assuming all links of the fabric interconnect 112. Accordingly, if the compute node 102 does not receive any indication that any links are non-operational, the route generator 145 generates the routes 148 to include routes to each of the other nodes via the dimensional-ordered routing rules. In response to receiving indications (either based on its own loopback messages or on an indication received from another node) that one or more links of the fabric are not operational, the route generator 145 identifies, as described further below with respect to FIGS. 3-8, which nodes are unreachable under the dimensional-ordered routing constraints because of the one or more non-operational links. The route generator 145 then identifies, as described further below with respect to FIGS. 3-8, one or more intermediate nodes for the unreachable nodes, and generates the routes 148 to route messages to the unreachable nodes via the intermediate nodes. In some embodiments, to identify the unreachable and intermediate nodes, the route generator 145 employs a hardware model of the server 100, with individual elements of the hardware model corresponding to different server nodes. Each element indicates the reachability of the corresponding node, based on the reachability of its connected elements. By employing the hardware model, the route generator 145 can identify the reachability of different nodes in parallel, reducing the amount of time it takes to identify unreachable nodes and corresponding intermediate nodes.

In some embodiments, each of the compute nodes 101-106 updates its stored set of routes based on changes to the links of the fabric interconnect 112. This allows each compute node to respond to link changes, ensuring that routes are kept up-to-date and messages are not lost or misrouted. For example, each of the nodes of the server 100 periodically sends loopback messages to its corresponding connected nodes to determine whether the links are operational and, in response to identifying a non-operational link, sends messages to each of the other nodes indicating the non-operational link. Each compute node then identifies any new unreachable nodes, and updates its stored set of routes to include new routes (via intermediate nodes) to the new unreachable nodes. Further, in response to identifying that a previously non-operational link is now operational, each compute node identifies whether any previously unreachable nodes are now reachable under the dimensional-ordered routing constraints. In response to determining that a previously unreachable node is now reachable, a compute node can update its stored set of routes to reflect a direct route (that is, a route that does not employ intermediate nodes) to the newly reachable node. Because each node generates and updates its own set of routes, these changes to the status of the links of the fabric interconnect 112 can be incorporated by the server 100 quickly, without requiring a central management node to generate new routes for each node in response to each change in link status.

In some embodiments, a compute node of the server 100 can identify a link as non-operational based on a cost metric of the link. For example, the compute node may identify one or more characteristics indicating the quality of a link, such as signal-to-noise ratio or other signal characteristics, congestion associated with the link, link bandwidth, latency, and the like, and identify one or more cost values for the link based on these characteristics. Based on the one or more cost values for each link, the compute node can both identify if a connected node is unreachable, at least with respect to that compute node, and also select among a plurality of possible intermediate nodes to communicate messages to unreachable nodes. This allows each of the compute nodes 101-106 to adjust its routes based on the quality of each link in the fabric interconnect 112, improving server efficiency.

Figure 2:
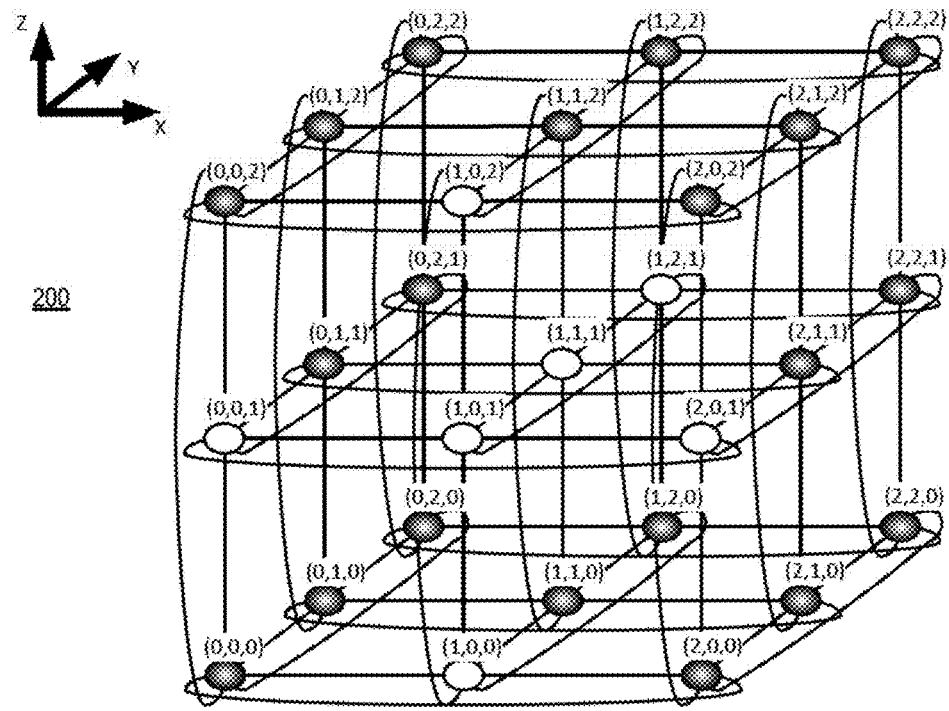
FIG. 2 is a block diagram illustrating an example network topology implemented for a cluster compute server in accordance with some embodiments.
Figure 3:
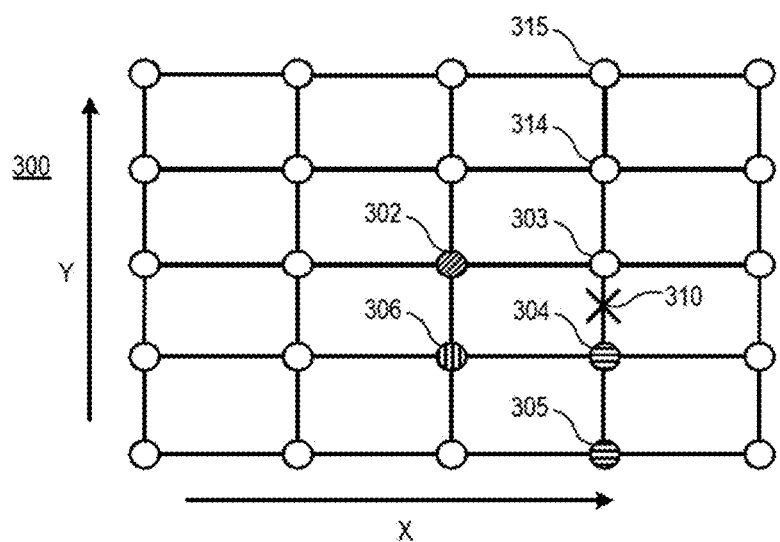
FIG. 3 is a block diagram illustrating use of an intermediate node to communicate a message between compute nodes of a cluster compute server in accordance with some embodiments.

FIG. 2 illustrates an example configuration of the server 100 in a network topology arranged as a k-ary n-cube, or multi-dimensional torus, in accordance with some embodiments. In the depicted example, the server 100 implements a three-dimensional (3D) torus network topology (referred to herein as "torus network 200") with a depth of three (that is, k=n=3). Accordingly, the server 100 implements a total of twenty-seven nodes arranged in a network of rings formed in three orthogonal dimensions (X,Y,Z), and each node is a member of three different rings, one in each of the dimensions. Each node is connected to up to six neighboring nodes via bidirectional serial links of the fabric interconnect 112 (see FIG. 1). The relative location of each node in the torus network 200 is identified in FIG. 2 by the position tuple (x,y,z), where x, y, and z represent the positions of the compute node in the X, Y, and Z dimensions, respectively. As such, the tuple (x,y,z) of a node also may serve as its address within the torus network 200, and thus serve as source routing control for routing packets to the destination node at the location represented by the position tuple (x,y,z).

In some embodiments, in response to a system reset the fabric interconnect 112 configures each node so that one or more media access control (MAC) addresses is temporarily or permanently associated with a given node. Some or all of such associated MAC address may directly represent the position tuple (x,y,z), which allows the location of a destination node in the torus network 200 to be determined and source routed based on the destination MAC address of the packet. During configuration, distributed look-up tables of MAC address to position tuple translations may be cached at the nodes to facilitate the identification of the position of a destination node based on the destination MAC address.

It will be appreciated that the illustrated X, Y, and Z dimensions represent logical dimensions that describe the positions of each node in a network, but do not necessarily represent physical dimensions that indicate the physical placement of each node. For example, the 3D torus network topology for torus network 200 can be implemented via the wiring of the fabric interconnect 112 with the nodes in the network physically arranged in one or more rows on a backplane or in a rack. That is, the relative position of a given node in the torus network 200 is defined by nodes to which it is connected, rather than the physical location of the compute node. In some embodiments, the fabric 122 (see FIG. 1) comprises a plurality of sockets wired together via the fabric interconnect 112 so as to implement the 3D torus network topology, and each of the nodes comprises a field replaceable unit (FRU) configured to couple to the sockets used by the fabric interconnect 112, such that the position of the node in torus network 200 is dictated by the socket into which the FRU is inserted.

In the server 100, after configuration of the fabric interconnect 112, messages communicated between nodes are segmented into one or more packets, which are routed over a routing path between the source node and the destination node. The routing path may include zero, one, or more than one other node. As noted above, each node, including each I/O node, includes an interface to the fabric interconnect 112 that implements a link layer switch to route packets among the ports of the node connected to corresponding links of the fabric interconnect 212. In some embodiments, after configuration these distributed switches operate to route packets over the fabric 122 under a set of routing constraints, such as a strict deterministic dimensional-order routing scheme (that is, completely traversing the torus network 200 in one dimension before moving to another dimension) that aids in avoiding fabric deadlocks and other potential errors. To illustrate an example of strict deterministic dimensional-order routing, a packet transmitted from the node at location (0,0,0) to location (2,2,2) would, if initially transmitted in the X dimension from node (0,0,0) to node (1,0,0) would continue in the X dimension to node (2,0,0), whereupon it would move in the Y plane from node (2,0,0) to node (2,1,0) and then to node (2,2,0), and then move in the Z plane from node (2,2,0) to node (2,2,1), and then to node (2,2,2). The order in which the planes are completely traversed between source and destination may be preconfigured.

In some scenarios, if a link becomes non-operational (due to a physical error, software error, or other factor), it can render one or more nodes unreachable under the routing constraints of the server 100. This can be understood with reference to FIG. 3, which illustrates a two-dimensional fabric 300 including 25 compute nodes connected via a set of links. Although the fabric 300 is two-dimensional, the techniques described herein are applicable to higher-dimension fabrics, including a fabric arranged in a 3-dimensional topology such as the topology illustrated in FIG. 2.

For purposes of description, it is assumed that the fabric 300 is governed by dimensional-ordered routing rules, wherein the dimension order is first in the X (horizontal) dimension, followed by the Y dimension. Thus, a message being sent from a source node to a destination node must follow a route wherein it first traverses along the X dimension until it reaches a node having the same X coordinate as the destination node. The route then proceeds in the Y direction until the destination node is reached. For example, the route from node 302 to node 315 first moves along the X direction from node 302 to node 303, then proceeds in the Y direction to node 314, and finally to node 315.

In the illustrated example of FIG. 2, a link 310 between nodes 303 and 304 is non-operational, rendering some nodes unreachable from other nodes under the dimensional-ordered routing constraints of the fabric 300. For example, with respect to node 302, node 304 is unreachable, because the dimensional-ordered routing constraints require that the route from node 302 to node 304 proceed first in the X direction to node 303, and then in the Y direction via link 310 to node 304. For similar reasons, node 305 is also an unreachable node for node 302.

In response to receiving an indication that link 310 is not operational, node 302 identifies that node 304 is not reachable. Node 302 then identifies, as described further herein, that node 306 is reachable from node 302 under the dimensional-ordered routing constraints. Node 302 further identifies that node 304 can be reached from node 306 under the dimensional ordered routing constraints. Accordingly, node 302 identifies node 306 as an intermediate node for unreachable node 304. Node 302 updates its stored set of routes so that any messages it generates targeted to node 304 are sent via the intermediate node 306. The node 302 similarly identifies intermediate nodes, and updates the corresponding routes, for any other unreachable nodes, such as node 305.

To send a message via the intermediate node 306, the node 302 forms the message having a header that indicates the intermediate node 306 is the destination node of the message. In addition, the node 302 forms the message having a payload that indicates to the intermediate node 306 that it is to forward the message on to node 302. After forming the message, the node 302 provides the message to the fabric interconnect, which routes the message to intermediate node 306 based on the header, and according to the nominal dimensional-order routing constraints. The intermediate node 306 decodes the message and determines that it is to be forwarded to the node 304. In response, the intermediate node 306 reforms the message having a header indicating that node 304 is the destination node of the reformed message. The node 306 provides the reformed message to the fabric interconnect, which routes the reformed message to node 304 based on the header, and according to the nominal dimensional-order routing constraints.

To identify intermediate nodes between a given node (referred to for purposes of description as the source node) and an unreachable node, the source node of the server 100 first identifies a set, referred to for purposes of description as the set R, of nodes that are reachable under the nominal routing constraints for the fabric interconnect 112, where the nominal routing constraints are the routing constraints that govern the routes used by the fabric interconnect 112 to communicate messages during normal operation of the server 100. The source node then identifies the set of nodes, referred to for purposes of description as the set S, that are reachable by routes from the unreachable node under a different set of routing constraints than the nominal routing constraints. In some embodiments, the different set of routing constraints is the set of routing constraints that represent the reverse of the nominal set of routing constraints, or the set of routing constraints that will result in routes that, if reversed would comply with the nominal set of routing constraints. For example, if the nominal set of routing constraints is dimensional-ordered routing in a particular dimension order, the different set of routing constraints can be dimensional ordered routing in a different dimensional order, such as the opposite of the dimensional order of the nominal set of routing constraints. Thus, if the nominal set of routing constraints is dimensional-order routing where the dimension order is X followed by Y followed by Z, the different set of routing constraints can be dimensional-order routing where the dimension order is Z, followed by Y, followed by X.

After identifying the set R and the set S, the source node identifies the set of intermediate nodes, referred to for purposes of description as the set I, as the intersection between the set R and the set S. That is, the set I is identified according to the following expression:

$$I = R \cap S$$

Figure 4:
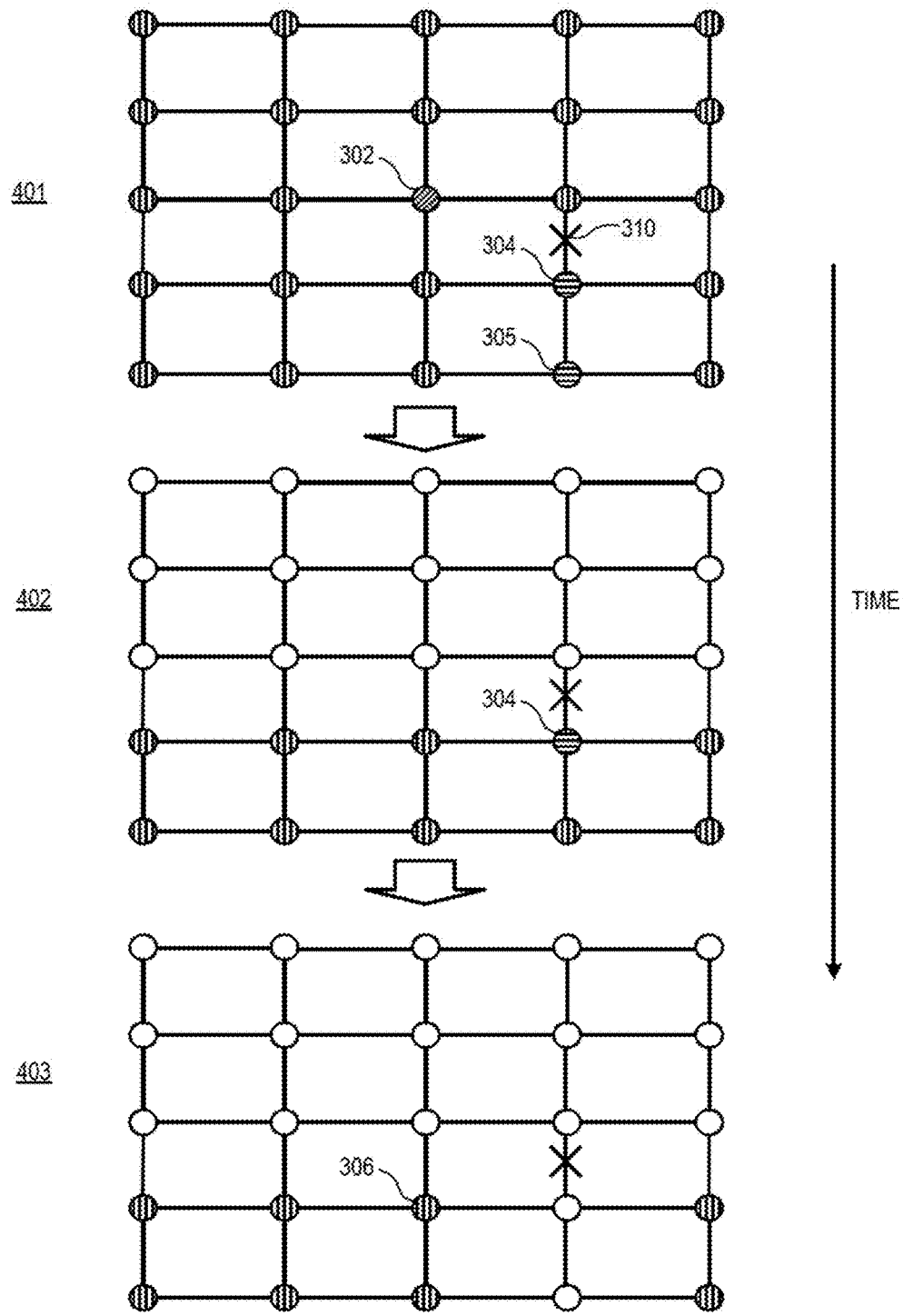
FIG. 4 is a diagram illustrating identification of intermediate nodes in the network topology of FIG. 3 in accordance with some embodiments.

An example of identifying a set of intermediate nodes is illustrated at FIG. 4 in accordance with some embodiments. In the example of FIG. 4, the node 302 is the source node and node 304 is an unreachable node, due to the non-operational link 310. At a time 401 the source node 302 identifies the set of reachable nodes R that it can reach following the nominal dimensional-order routing constraints (with a dimensional order of X followed by Y). These nodes are illustrated in the diagram corresponding to time 401 with cross-hatching of vertical lines. The unreachable nodes (nodes 304 and 305) are illustrated with cross-hatching of horizontal lines.

In at least one embodiment, the node 302 identifies the set R by maintaining a model of the fabric 300, either in hardware (e.g., in a programmable gate array or other structure), in software, or a combination thereof. The model indicates which links of the fabric 300 are non-operational. The node 302 sends test signals from the modeled source node to each other modeled node of the fabric 300, wherein the test signals follow the nominal dimension ordered routing constraints. The node 302 identifies which nodes of the model are reached by the test signals, and identifies the corresponding nodes of the fabric 300 as included in the set R.

At time 402, the node 302 identifies the set S of nodes that are reachable by routes that originate at the node 304 and that follow dimensional-order routing constraints of the opposite dimensional order as the nominal dimensional-order routing constraints used to determine the set R at time 401. Thus, the node 302 identifies the set S by identifying the nodes that are reachable by routes that originate at the node 304 and follow a dimensional-order routing constraint with a dimensional order of Y, then X. The nodes in the set S are illustrated in the diagram corresponding to time 402 with cross-hatching of vertical lines.

In at least one embodiment, the node 302 identifies the set S using the same or similar model used to identify the set R. The node 302 sends, in its modeled fabric, test signals from the modeled unreachable node (node 304) to each other modeled node of the fabric 300, wherein the test signals follow the dimensional-order routing constraints of the opposite dimensional order as the nominal routing constraints. The node 302 identifies which nodes of the model are reached by the test signals, and identifies the corresponding nodes of the fabric 300 as included in the set S.

At time 403 the node 302 identifies the set I of intermediate nodes by identifying the intersection of the sets R and S. In the diagram corresponding to time 403, the nodes of the set I are identified with cross-hatching of vertical lines. In some embodiments, as in the depicted example of FIG. 4, the set I can include multiple intermediate nodes. The node 302 can identify a cost associated with each intermediate node of the set I, and select an intermediate node based on the identified cost. The cost can reflect distance from the intermediate node to the unreachable node, congestion, latency, signal integrity, bandwidth, and the like or any combination thereof. In some embodiments, the cost is not a single value, but includes multiple values, such as a tuple indicating latency, signal integrity, and bandwidth. To illustrate, the node 302 can identify a cost value associated with each link of the fabric. This cost value can be a variable amount that reflects congestion along the corresponding link, a fixed amount, and the like. For each intermediate node, the node 302 can determine a total cost by combining the cost values of all the links required to communicate a message from the node 302 to the intermediate node and the cost values of all the links required to communicate the message from the intermediate node to the unreachable node. The cost values can be combined by adding the cost values, multiplying the cost values together, determining a maximum of the cost values, and the like. The node 302 can then select, for example, the intermediate node having the lowest combined cost value, and use the selected intermediate node to communicate messages to the unreachable node.

Figures 5, 6:
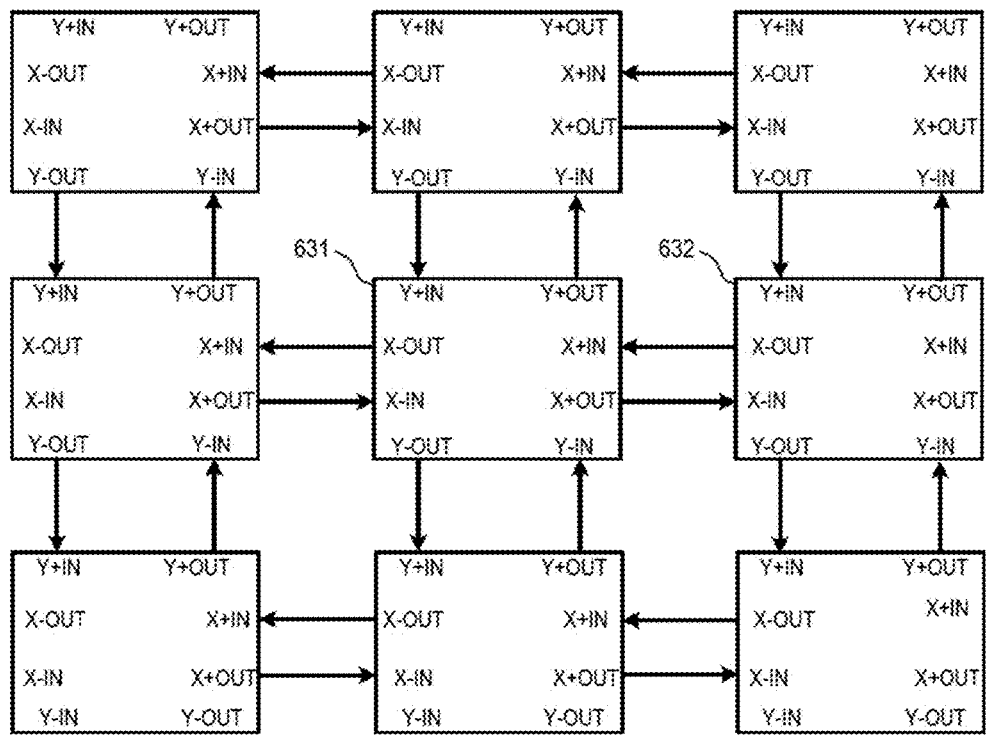
FIG. 5 is a diagram illustrating a table of routes stored at a compute node of a cluster compute server in accordance with some embodiments.
FIG. 6 is a block diagram of a portion of a route generator of FIG. 1 in accordance with some embodiments.

FIG. 5 illustrates a diagram of a table 500 storing the routes 148 of FIG. 1 in accordance with some embodiments. The table 500 includes a node column 502, a route strength column 504, an intermediate nodes and costs column 506, and a route column 508. The node column 502 indicates a corresponding node. In the depicted example, the nodes are indicated in the node column by an offset indicating their location, relative to the compute node 102, in the 3D topology of the fabric interconnect 112. Thus, for example, the node entry for row 510 indicates the information in the row corresponds to the node that is offset from the compute node by +1 in the X dimension, +1 in the Y dimension, and 0 in the Z dimension.

The route strength column 504 indicates a strength value for the nominal route between the compute node 102 and the corresponding node (identified in node column 602). As used herein, the nominal route refers to the route between a source compute node and another node established using the nominal routing constraints of the fabric interconnect. In some embodiments, the route strength value is a binary value, wherein an asserted value indicates that the corresponding node identified in column 502 is unreachable from the compute node 102. In some embodiments, including the depicted example, the route strength value has a wider range (e.g., 1-100) and the value indicates a quality of the nominal route. The compute node 102 can determine the route strength value based on any of a number of factors, such as errors detected at one or more links of the nominal route, and the like. The compute node 102 can compare the route strength value to a threshold and, in response to the route strength value being below the threshold, identify the node identified in column 602 as an unreachable node.

The intermediate nodes and costs column 506 indicates, if the node identified in column 502 has been identified as an unreachable node, the set of intermediate nodes that can be used to reach the unreachable node. The column 506 also indicates a cost value for each intermediate node, which can be determined as described above with respect to FIG. 4. The route column 508 indicates the route between the compute node 102 and the node identified in the column 502. For nodes that are reachable, the route of the route column 508 does not include any intermediate nodes, and indicates the dimensional-order route to the node. For nodes that are unreachable, the route column 508 indicates the chain of intermediate nodes that are to be used to reach the node identified in the column 502. Thus, the route column 508 indicates the route from the compute node 102 to the first intermediate node in the chain, the route from the first intermediate node in the chain to the next intermediate node in the chain, and so on, and includes the route from the last intermediate node in the chain to the node identified in the column 502. The compute node 102 uses the information in the route column 508 when forming messages to indicate the route to be followed by each message.

FIG. 6 is a block diagram of a portion of the route generator 145 of FIG. 1 in accordance with some embodiments. In the illustrated example, the route generator 145 includes a plurality of computational elements (e.g., computational elements 631 and 632) that collectively model the fabric interconnect 112. In particular, each computational element indicates the reachability of a corresponding different node of the server 100. A computational element corresponding to a given node is connected to the computational elements corresponding to the nodes connected to the given node, such that the plurality of computational elements models the topology of the fabric interconnect 112. In the illustrated example of FIG. 6, the computational elements model a 2-dimensional fabric interconnect having nine nodes.

Each computational element includes inputs for signals designated "X+IN", "X−IN", "Y+IN", and "Y−IN". Each of these signals indicates the reachability, from the node corresponding to the computational element of one of the corresponding connected nodes in a corresponding direction. In particular, the X+IN signal indicates whether the node that is offset by one in the positive X direction from the node corresponding to the computational element in the fabric topology is reachable. The X−IN indicates whether the node that is offset by one in the negative X direction from the node corresponding to the computational element in the fabric topology is reachable. Similarly, the Y+IN signal indicates whether the node that is offset by one in the positive Y direction from the node corresponding to the computational element in the fabric topology is reachable, and the Y−IN signal indicates whether the node that is offset by one in the negative Y direction from the node corresponding to the computational element in the fabric topology is reachable. Each computational element also includes inputs (not shown at FIG. 6) indicating whether one or more of the links between the node corresponding to the computational element and its connected nodes are operational.

Each computational element logically combines the input signals to generate one or more stored bits of information that indicate whether the corresponding node is reachable or unreachable. In addition, each computational elements generates output signals designated "X+OUT", "X−OUT", "Y+OUT", and "Y−OUT", wherein each of these signals indicates the reachability of the corresponding connected nodes from the node corresponding to the computational element. These output signals are employed as the input signals for the computational elements corresponding to those connected nodes, as illustrated at FIG. 6. The computational elements thereby model the fabric interconnect to determine the reachability of each node.

For example, the computational element 631 can correspond to the node 102 and the other computational elements correspond to other nodes of the server 100. To determine the reachability of each node from the node 102, the route generator 145 resets each of the computational elements to an initial state. It then identifies, based on messages received from other nodes, the status of each of the links between nodes in the fabric interconnect 112 (e.g., whether the link is operational), and sets the state of corresponding input signals for each computational element based on the status of each link. This causes the states of one or more of the output signals for one or more of the computational elements to change state. The route generator 145 applies clock signals to each computation element to synchronize the changes in states, until the changes have propagated through all of the computational elements. The route generator 145 then identifies, based on the one or more bits of information stored at each computational element, which nodes are unreachable from the node 102.

In response to receiving a message indicating a change in the status of a link of the fabric interconnect 112, the route generator 145 resets each computational element and repeats the process to identify the unreachable nodes. Because the state of the computational elements change in parallel, the route generator 145 is able to quickly identify the unreachable nodes. Further, the route generator 145 can use a model similar to that illustrated in FIG. 6 to identify nodes that are reachable from an unreachable node, as described above with respect to FIG. 4, thereby quickly identifying intermediate nodes.

Figure 7:
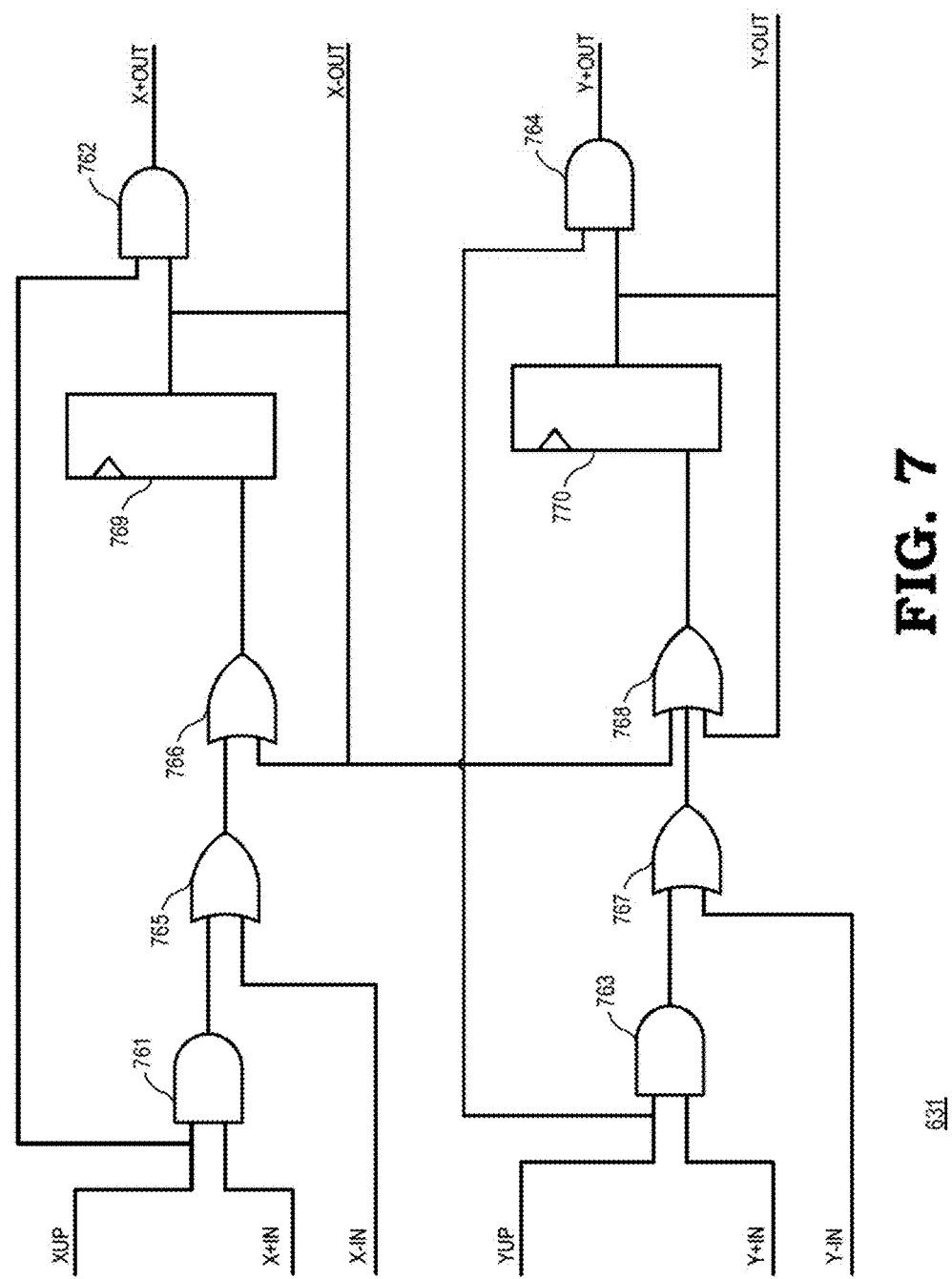
FIG. 7 is a diagram of a computational element of FIG. 6 in accordance with some embodiments.

FIG. 7 is a diagram of the computational element 631 of FIG. 6 in accordance with some embodiments. The computational element 631 includes AND gates 761-764, OR gates 765-768, and latches 769 and 770. The AND gate 761 includes an input to receive a signal designated "XUP", an input to receive the signal X+IN, and an output. The OR gate 765 includes an input connected to the output of the AND gate 761, an input to receive the signal X−IN, and an output. The OR gate 766 includes a first input connected to the output of the OR gate 765, a second input, and an output. The latch 769 includes an input connected to the output of the OR gate 766 and an output to provide the signal X−OUT, the output connected to the second input of the OR gate 766. The AND gate 762 includes an input to receive the signal XUP, an input connected to the output of the latch 769, and an output to provide the signal X+OUT.

The AND gate 763 includes an input to receive a signal designated "YUP", an input to receive the signal Y+IN, and an output. The OR gate 767 includes an input connected to the output of the AND gate 761, an input to receive the signal X−IN, and an output. The OR gate 768 includes a first input connected to the output of the latch 769, a second input connected to the output of the OR gate 767, a third input, and an output. The latch 770 includes an input connected to the output of the OR gate 768 and an output to provide the signal Y−OUT, the output connected to the third input of the OR gate 768. The AND gate 764 includes an input to receive the signal YUP, an input connected to the output of the latch 770, and an output to provide the signal Y+OUT.

The signal XUP indicates whether the link operational between the node corresponding to the computational element 631 and the node offset in the positive X direction. Similarly, the signal YUP indicates whether the link operational between the node corresponding to the computational element 631 and the node offset in the positive X direction. The latch 769 stores a bit of information, wherein an asserted bit indicates the node corresponding to the computational element 631 is reachable via the X plane. Similarly, the latch 770, stores a bit of information, wherein an asserted bit indicates the node corresponding to the computational element 631 is reachable via the Y plane. Accordingly, if the bits stored at the latches 769 and 770 are both in a negated state, the node corresponding to the computational element 631 is indicated to be unreachable.

In operation, in response to a message indicating a change in status of a link of the fabric interconnect 112, the route generator 145 resets the states of the latches 769 and 770 via reset circuitry (not shown), and also resets the states of the latches for the other computational elements of FIG. 6. The route generator 145 then sets the states of the XUP and YUP signals for each of the computational elements based on the status of the corresponding links, wherein an asserted signal indicates an operational link and a negated signal indicates a non-operational link. The route generator 145 applies a clock signal to the latches (e.g., latches 769 and 770) of the computational elements. The AND and OR gates at each computational element combine the respective input signals to set the information at the corresponding latches and also to generate the corresponding output signals. After a number of clock cycles, depending on the number of computational elements, the information stored at the latches of the computational elements reaches a settled state. The route generator 145 then reads each of the latches to identify which nodes are unreachable.

Figure 8:
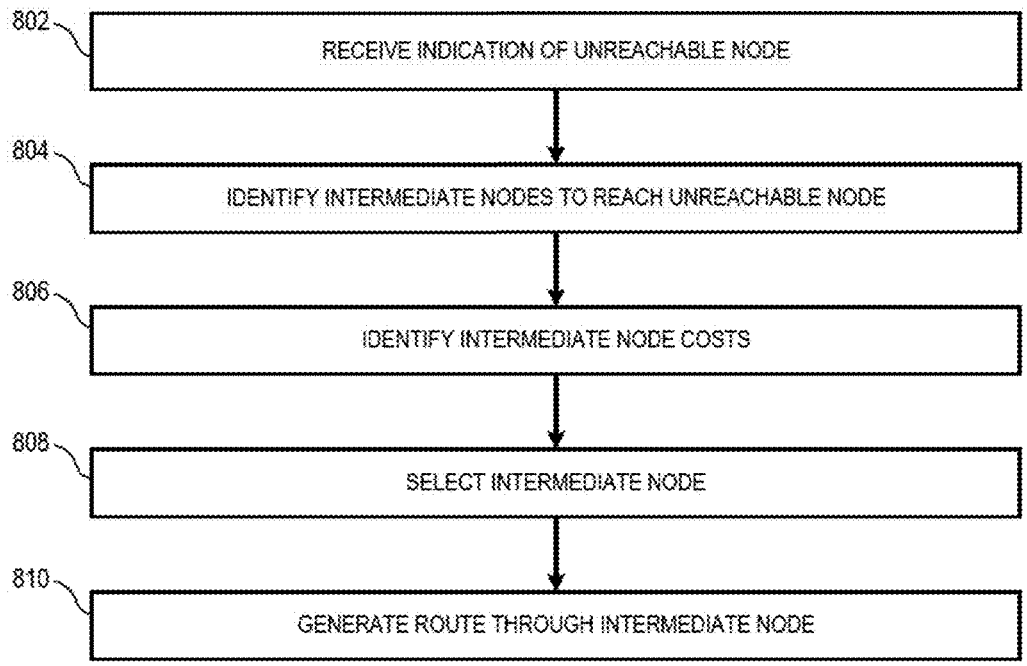
FIG. 8 is a flow diagram illustrating a method of identifying, at a compute node, routes to other compute nodes of a cluster compute server in accordance with some embodiments.

FIG. 8 is a flow diagram of a method 800 of generating routes at compute nodes of a cluster compute server in accordance with some embodiments. At block 802, the compute node 102 receives an indication from another node that a link has become non-operational, rendering a node unreachable. At block 804 the compute node 102 identifies the set of intermediate nodes for the unreachable node, as described above with respect to FIG. 4. At block 806 the compute node 102 identifies a cost for each intermediate node based on congestion associated with the intermediate node, a proximity of the intermediate node, or other factors. At block 808 the compute node 102 selects an intermediate node from the set of intermediate nodes based on the costs identified at block 806. At block 808 the compute node 102 generates a route to the unreachable node through the selected intermediate node and communicates a message to the unreachable node via the generated route.

Figure 9:
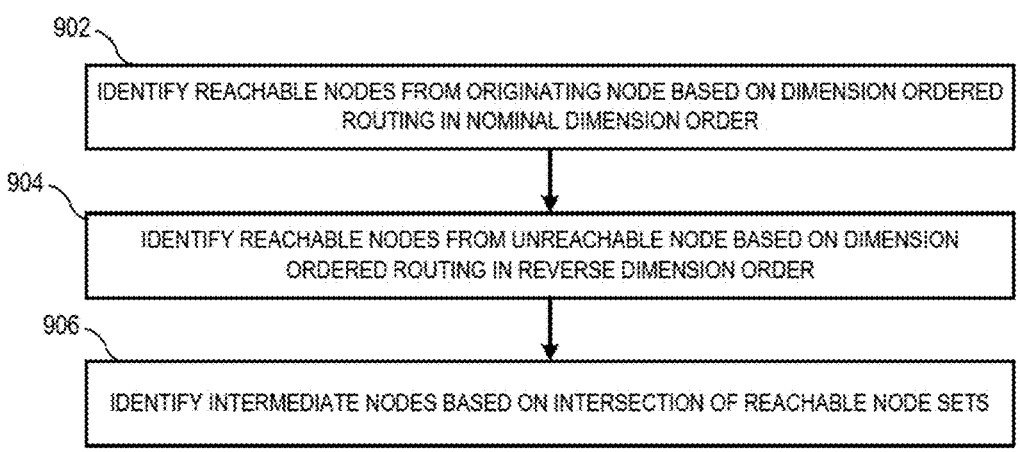
FIG. 9 is a flow diagram of a method of identifying intermediate nodes at a compute node of a cluster compute server in accordance with some embodiments.

FIG. 9 is a flow diagram of a method 900 of identifying a set of intermediate nodes at a compute node of a cluster compute server in accordance with some embodiments. At block 902 the compute node 102 identifies nodes that are reachable from the originating node (compute node 102) based on the nominal dimensional-order routing constraints, in the nominal dimensional order. At block 904 the compute node 102 identifies nodes that are reachable from the unreachable node based on dimensional order routing constraints in the reverse dimensional order from the nominal dimensional order. At block 906 the compute node 102 identifies the intermediate nodes based on the intersection of the set of reachable nodes identified at block 902 and the set of reachable nodes identified at block 904.

Figure 10:
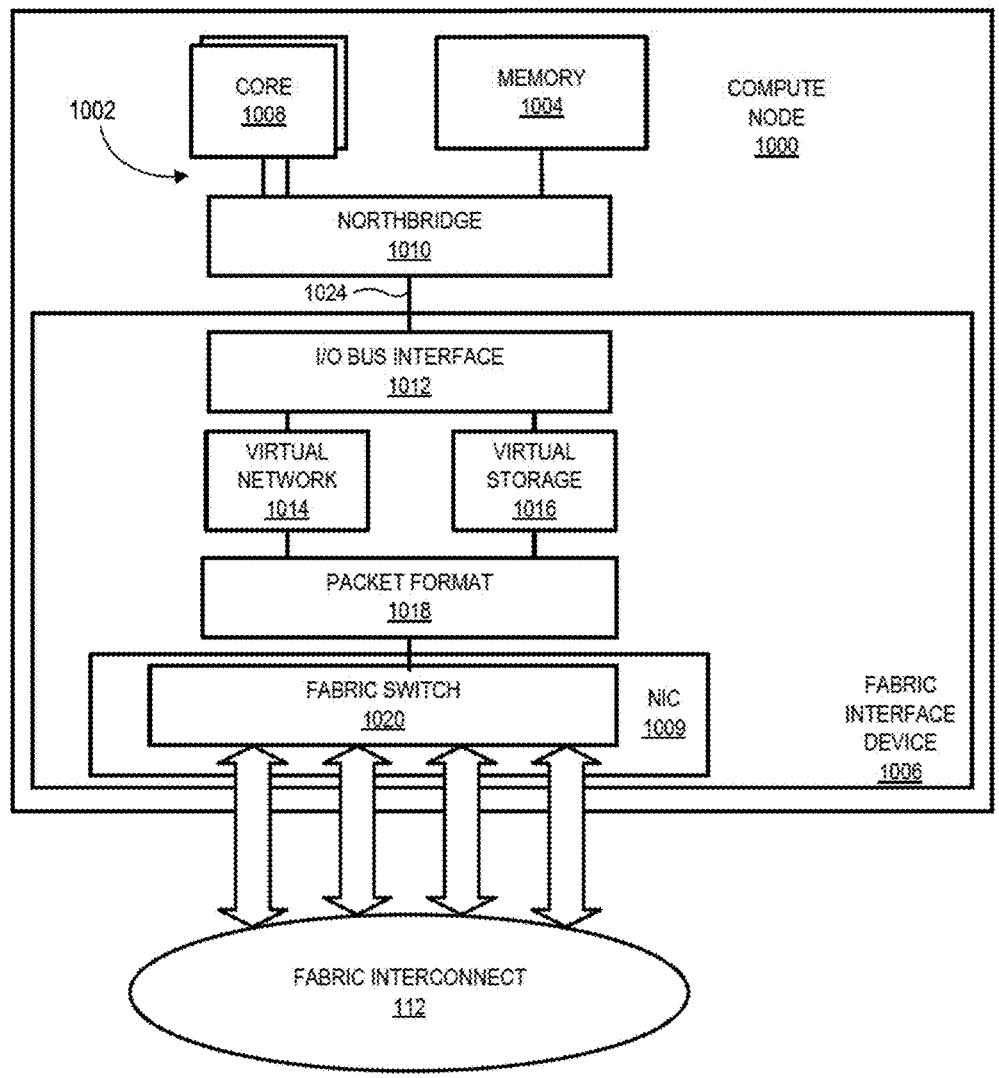
FIG. 10 is a block diagram illustrating an example implementation of a compute node of a cluster compute server in accordance with some embodiments.

FIG. 10 illustrates a compute node 1000 implemented in the server 100 of FIG. 1 in accordance with some embodiments. The compute node 1000 corresponds to, for example, one of the compute nodes 101-106 of FIG. 1. In the depicted example, the compute node 1000 includes a processor 1002, system memory 1004, and a fabric interface device 1006. The processor 1002 includes one or more processor cores 1008 and a northbridge 1010. The one or more processor cores 1008 can include any of a variety of types of processor cores, or combination thereof, such as a central processing unit (CPU) core, a graphics processing unit (GPU) core, a digital signal processing unit (DSP) core, and the like, and may implement any of a variety of instruction set architectures, such as an x86 instruction set architecture or an Advanced RISC Machine (ARM) architecture. The system memory 1004 can include one or more memory modules, such as DRAM modules, SRAM modules, flash memory, or a combination thereof. The northbridge 1010 interconnects the one or more cores 1008, the system memory 1004, and the fabric interface device 1006. The fabric interface device 1006, in some embodiments, is implemented in an integrated circuit device, such as an application-specific integrated circuit (ASIC), a field-programmable gate array (FPGA), mask-programmable gate arrays, programmable logic, and the like.

In a conventional computing system, the northbridge 1010 would be connected to a southbridge, which would then operate as the interface between the northbridge 1010 (and thus the processor cores 1008) and one or local more I/O controllers that manage local peripheral resources. However, as noted above, in some embodiments the compute node 1000 does not maintain local peripheral resources or their I/O controllers, and instead uses shared remote peripheral resources at other nodes in the server 100. To render this arrangement transparent to software executing at the processor 1002, the fabric interface device 1006 virtualizes the remote peripheral resources allocated to the compute node such that the hardware of the fabric interface device 1006 emulates a southbridge and thus appears to the northbridge 1010 as a local southbridge connected to local peripheral resources.

To this end, the fabric interface device 1006 includes an I/O bus interface 1012, a virtual network controller 1014, a virtual storage controller 1016, a packet formatter 1018, and a NIC 1019 comprising a fabric switch 1020. The I/O bus interface 1012 connects to the northbridge 1010 via a local I/O bus 1024 and acts as a virtual endpoint for each local processor core 1008 by intercepting requests addressed to virtualized peripheral resources that appear to be on the local I/O bus 1024 and responding to the requests in the same manner as a local peripheral resource, although with a potentially longer delay due to the remote location of the peripheral resource being virtually represented by the I/O bus interface 1012.

While the I/O bus interface 1012 provides the physical interface to the northbridge 1010, the higher-level responses are generated by the virtual network controller 1014 and by the virtual storage controller 1016. Requests sent over I/O bus 1024 for a network peripheral connected to an external network, such as an Ethernet NIC connected to the data center network 114 (FIG. 1), are routed by the I/O bus interface 1012 to the virtual network controller 1014, while storage requests are routed by the I/O bus interface 1012 to the virtual storage controller 1016. The virtual network controller 1014 provides processing of incoming and outgoing requests based on, for example, an Ethernet protocol. The virtual storage controller provides processing of incoming and outgoing requests based on, for example, a serial ATA (SATA) protocol, a serial attached SCSI (SAS) protocol, a Universal Serial Bus (USB) protocol, and the like.

After configuration of each of the compute nodes, the compute node 1000 executes software services that generate requests. After being processed by either the virtual network controller 1014 or the virtual storage controller 1016, requests are forwarded to the packet formatter 1018, which encapsulates the request into one or more packets. The packet formatter 1018 then determines the fabric address or other location identifier of the I/O node managing the physical peripheral resource intended for the request. The packet formatter 1018 adds the identified fabric address (referred to herein as the "fabric ID") to the headers of the one or more packets in which the request is encapsulated and provides the packets to the fabric switch 1020 of the NIC for transmission.

As illustrated, the fabric switch 1020 implements a plurality of ports, each port interfacing with a different link of the fabric interconnect 112. To illustrate using the 3×3 torus network 200 of FIG. 2, assume the compute node 1000 represents the node at (1,1,1). In this example, the fabric switch 1020 would have at least seven ports to couple it to seven bi-directional links: an internal link to the packet formatter 1018; an external link to the node at (0,1,1); an external link to the node at (1,0,1), an external link to the node at (1,1,0), an external link to the node at (1,2,1), an external link to the node at (2,1,1), and an external link to the node at (1,1,2). After configuration of the compute node 1000, control of the switching of data among the ports of the fabric switch 1020 is determined based on integrated deterministic switching logic, which specifies the egress port based on the destination address (that is, destination fabric ID) indicated by the packet and based on the deterministic routing implemented in the server 100. The destination fabric ID of each compute node can be distributed to the respective nodes during configuration.

During normal execution of software services, the compute node 1000 handles received packets as follows. For packets received from another other node, wherein the packet's destination is the compute node 1000, the fabric switch 1020 routes the incoming packet to the port connected to the packet formatter 1018 based on the deterministic routing logic. The packet formatter 1018 then de-encapsulates the response/request from the packet and provides it to either the virtual network controller 1014 or the virtual storage controller 1016 based on a type-identifier included in the request. The controller receiving the request then processes the response/request and controls the I/O bus interface 1012 to signal the request to the northbridge 1010, whereupon the response/request is processed as though it were a response or request from a local peripheral resource.

For a transitory unicast packet for which the compute node 1000 is a node in the routing path for the packet, the fabric switch 1020 determines the destination address (e.g., the tuple (x,y,z)) from the header of the transitory packet, and provides the packet to a corresponding output port identified by the deterministic routing logic. In some embodiments, the fabric switch 1020 determines the destination address using a locally stored routing table.

Figure 11:
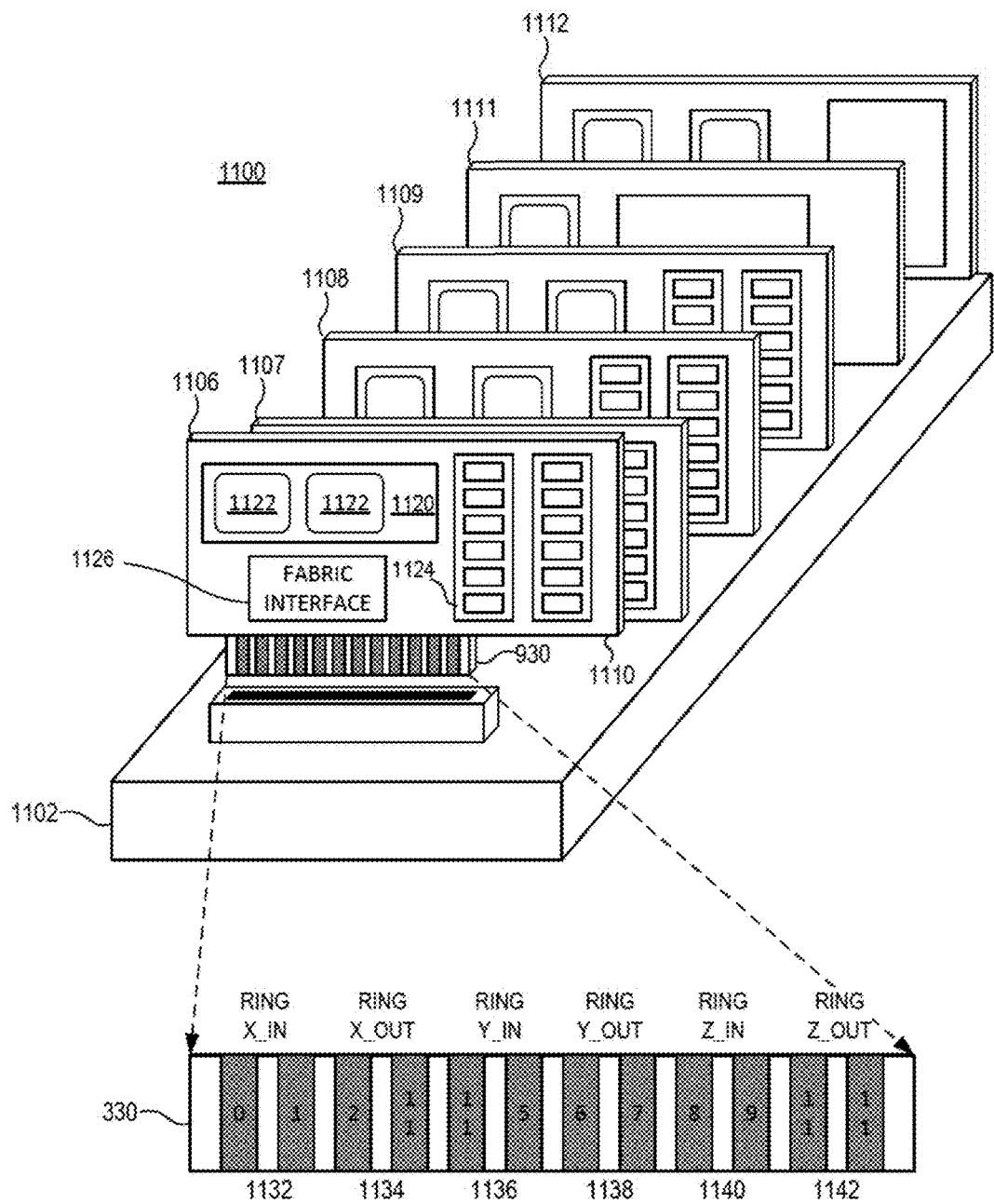
FIG. 11 is a block diagram illustrating an example physical arrangement of nodes of a cluster compute server in accordance with some embodiments.

FIG. 11 illustrates an example physical arrangement of nodes of the server 100 in accordance with some embodiments. In the illustrated example, the fabric interconnect 112 (FIG. 1) includes one or more interconnects 1102 having one or more rows or other aggregations of plug-in sockets 1104. The interconnect 1102 can include a fixed or flexible interconnect, such as a backplane, a printed wiring board, a motherboard, cabling or other flexible wiring, or a combination thereof. Moreover, the interconnect 1102 can implement electrical signaling, photonic signaling, or a combination thereof. Each plug-in socket 1104 comprises a card-edge socket that operates to connect one or more FRUs, such as FRUs 1106-1111, with the interconnect 1102. Each FRU represents a corresponding node of the server 100. For example, FRUs 1106-1109 may comprise compute nodes, FRU 1110 may comprise a network node, and FRU 1111 can comprise a management node.

Each FRU includes components disposed on a PCB, whereby the components are interconnected via metal layers of the PCB and provide the functionality of the node represented by the FRU. For example, the FRU 1106, being a compute node in this example, includes a PCB 1112 implementing a processor 1120 comprising one or more processor cores 422, one or more memory modules 1124, such as DRAM dual inline memory modules (DIMMs), and a fabric interface device 1126. Each FRU further includes a socket interface 1140 that operates to connect the FRU to the interconnect 1102 via the plug-in socket 1104.

The interconnect 1102 provides data communication paths between the plug-in sockets 1104, such that the interconnect 1102 operates to connect FRUs into rings and to connect the rings into a 2D- or 3D-torus network topology, such as the torus network 200 of FIG. 2. The FRUs take advantage of these data communication paths through their corresponding fabric interfaces, such as the fabric interface device 1126 of the FRU 1106. The socket interface 1140 provides electrical contacts (e.g., card edge pins) that electrically connect to corresponding electrical contacts of plug-in socket 1104 to act as port interfaces for an X-dimension ring (e.g., ring-X_IN port 1132 for pins 0 and 1 and ring-X_OUT port 1134 for pins 2 and 3), for a Y-dimension ring (e.g., ring-Y_IN port 1136 for pins 4 and 5 and ring-Y_OUT port 1138 for pins 6 and 7), and for an Z-dimension ring (e.g., ring-Z_IN port 1140 for pins 8 and 9 and ring-Z_OUT port 1142 for pins 10 and 11). In the illustrated example, each port is a differential transmitter comprising either an input port or an output port of, for example, a PCIE lane. A skilled artisan will understand that a port can include additional TX/RX signal pins to accommodate additional lanes or additional ports.

In some embodiments, the apparatus and techniques described above are implemented in a system comprising one or more integrated circuit (IC) devices (also referred to as integrated circuit packages or microchips). Electronic design automation (EDA) and computer aided design (CAD) software tools may be used in the design and fabrication of these IC devices. These design tools typically are represented as one or more software programs. The one or more software programs comprise code executable by a computer system to manipulate the computer system to operate on code representative of circuitry of one or more IC devices so as to perform at least a portion of a process to design or adapt a manufacturing system to fabricate the circuitry. This code can include instructions, data, or a combination of instructions and data. The software instructions representing a design tool or fabrication tool typically are stored in a computer readable storage medium accessible to the computing system. Likewise, the code representative of one or more phases of the design or fabrication of an IC device may be stored in and accessed from the same computer readable storage medium or a different computer readable storage medium.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Figure 12:
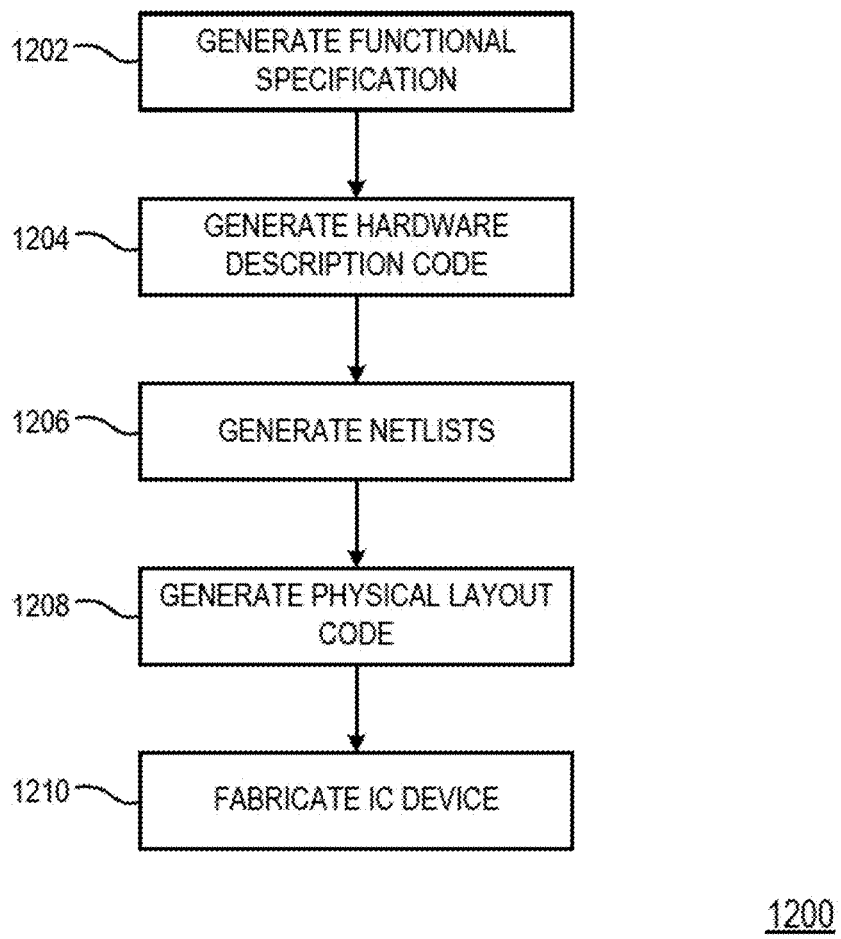
FIG. 12 is a flow diagram illustrating a method for designing and fabricating an integrated circuit device implementing at least a portion of a component of a processing system in accordance with some embodiments.

FIG. 12 is a flow diagram illustrating an example method 1200 for the design and fabrication of an IC device implementing one or more aspects in accordance with some embodiments. As noted above, the code generated for each of the following processes is stored or otherwise embodied in non-transitory computer readable storage media for access and use by the corresponding design tool or fabrication tool.

At block 1202 a functional specification for the IC device is generated. The functional specification (often referred to as a micro architecture specification (MAS)) may be represented by any of a variety of programming languages or modeling languages, including C, C++, SystemC, Simulink, or MATLAB.

At block 1204, the functional specification is used to generate hardware description code representative of the hardware of the IC device. In some embodiments, the hardware description code is represented using at least one Hardware Description Language (HDL), which comprises any of a variety of computer languages, specification languages, or modeling languages for the formal description and design of the circuits of the IC device. The generated HDL code typically represents the operation of the circuits of the IC device, the design and organization of the circuits, and tests to verify correct operation of the IC device through simulation. Examples of HDL include Analog HDL (AHDL), Verilog HDL, SystemVerilog HDL, and VHDL. For IC devices implementing synchronized digital circuits, the hardware descriptor code may include register transfer level (RTL) code to provide an abstract representation of the operations of the synchronous digital circuits. For other types of circuitry, the hardware descriptor code may include behavior-level code to provide an abstract representation of the circuitry's operation. The HDL model represented by the hardware description code typically is subjected to one or more rounds of simulation and debugging to pass design verification.

After verifying the design represented by the hardware description code, at block 1206 a synthesis tool is used to synthesize the hardware description code to generate code representing or defining an initial physical implementation of the circuitry of the IC device. In some embodiments, the synthesis tool generates one or more netlists comprising circuit device instances (e.g., gates, transistors, resistors, capacitors, inductors, diodes, etc.) and the nets, or connections, between the circuit device instances. Alternatively, all or a portion of a netlist can be generated manually without the use of a synthesis tool. As with the hardware description code, the netlists may be subjected to one or more test and verification processes before a final set of one or more netlists is generated.

Alternatively, a schematic editor tool can be used to draft a schematic of circuitry of the IC device and a schematic capture tool then may be used to capture the resulting circuit diagram and to generate one or more netlists (stored on a computer readable media) representing the components and connectivity of the circuit diagram. The captured circuit diagram may then be subjected to one or more rounds of simulation for testing and verification.

At block 1208, one or more EDA tools use the netlists produced at block 1206 to generate code representing the physical layout of the circuitry of the IC device. This process can include, for example, a placement tool using the netlists to determine or fix the location of each element of the circuitry of the IC device. Further, a routing tool builds on the placement process to add and route the wires needed to connect the circuit elements in accordance with the netlist(s). The resulting code represents a three-dimensional model of the IC device. The code may be represented in a database file format, such as, for example, the Graphic Database System II (GDSII) format. Data in this format typically represents geometric shapes, text labels, and other information about the circuit layout in hierarchical form.

At block 1210, the physical layout code (e.g., GDSII code) is provided to a manufacturing facility, which uses the physical layout code to configure or otherwise adapt fabrication tools of the manufacturing facility (e.g., through mask works) to fabricate the IC device. That is, the physical layout code may be programmed into one or more computer systems, which may then control, in whole or part, the operation of the tools of the manufacturing facility or the manufacturing operations performed therein.

In some embodiments, certain aspects of the techniques described above may implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A server system, comprising:
    a fabric interconnect to route messages; and
    a plurality of compute nodes coupled to the fabric interconnect to execute services for the server system, each of the plurality of compute nodes to:
        generate, at the compute node, a first set of routes to a first subset of compute nodes of the plurality of compute nodes based on a first set of routing constraints comprising a first dimension-ordered routing constraint associated with the fabric interconnect;
        generate, at the compute node, for a second subset of compute nodes of the plurality of compute nodes that are unreachable based on the first set of routing constraints, a second set of routes based on a second set of routing constraints comprising a second dimension-ordered routing constraint associated with the fabric interconnect different from the first dimension-ordered routing constraint; and
        route received messages to others of the plurality of compute nodes based on the first set of routes and the second set of routes, wherein the first set of routing constraints comprises dimension-ordered routing according to a first dimension order and the second set of routing constraints comprises dimension-ordered routing according to a second dimension order different from the first dimension order.

2. The server system of claim 1, wherein a first compute node of the plurality of compute nodes is to generate the second set of routes by:
    identifying a second compute node of the plurality of compute nodes as unreachable according to the first set of routing constraints.

3. The server system of claim 2, wherein the first compute node of the plurality of compute nodes is to generate the second set of routes by:
    in response to identifying the second compute node as unreachable, identifying a third compute node that is reachable from the first compute node according to the first set of routing constraints, wherein the second compute node is reachable from the third compute node according to the first set of routing constraints; and
    routing a message from the first compute node to the second compute node via the third compute node.

4. The server system of claim 3, wherein identifying the third compute node comprises:
    identifying a first set of compute nodes that are reachable from the first node according to the first set of routing constraints;
    identifying a second set of compute nodes that are reachable from the second node according to the second set of routing constraints different from the first set of routing constraints; and
    identifying the third node based on an intersection of the first set of compute nodes and the second set of compute nodes.

5. The server system of claim 4, wherein:
    the intersection of the first set of compute nodes and the second set of compute nodes comprises a plurality of intermediate nodes; and
    selecting the third node from the plurality of intermediate nodes based on a cost metric selected from the group consisting of: a number of hops between the first compute node and the third compute node, a number of hops between the third compute node and the second compute node, a congestion between the first compute node and the third compute node, and a congestion between the third compute node and the second compute node.

6. The server system of claim 2, wherein the first compute node identifies the second compute node as unreachable based on an error at a link of the fabric interconnect between the first compute node and the second compute node.

7. The server system of claim 2, wherein the first compute node identifies the second compute node as unreachable based on an amount of congestion at a link of the fabric interconnect between the first compute node and the second compute node.

8. A server system, comprising:
a fabric interconnect to route messages; and
a plurality of field replaceable units (FRUs) comprising a plurality of compute nodes coupled to the fabric interconnect to execute services for the server system, each of the plurality of compute nodes to:
generate, at the compute node, a first set of routes to a first subset of compute nodes of the plurality of compute nodes based on a first set of routing constraints comprising a first dimension-ordered routing constraint associated with the fabric interconnect;
generate, at the compute node, for a second subset of compute nodes of the plurality of compute nodes that are unreachable based on the first set of routing constraints, a second set of routes based on a second set of routing constraints comprising a second dimension-ordered routing constraint associated with the fabric interconnect different from the first dimension-ordered routing constraint; and
route received messages to others of the plurality of compute nodes based on the first set of routes and the second set of routes, wherein the first set of routing constraints comprises dimension-ordered routing according to a first dimension order and the second set of routing constraints comprises dimension-ordered routing according to a second dimension order different from the first dimension order.

9. The server system of claim 8, wherein a first compute node of the plurality of compute nodes is to generate the second set of routes by:
identifying a second compute node of the plurality of compute nodes as unreachable according to the first set of routing constraints.

10. The server system of claim 9, wherein the first compute node of the plurality of compute nodes is to generate the second set of routes by:
in response to identifying the second compute node as unreachable, identifying a third compute node that is reachable according to the first set of routing constraints, wherein the second compute node is reachable from the third compute node according to the first set of routing constraints; and
routing a message from the first compute node to the second compute node via the third compute node.

11. The server system of claim 10, wherein identifying the third compute node comprises:
identifying a first set of compute nodes that are reachable from the first node according to the first set of routing constraints;
identifying a second set of compute nodes that are reachable from the second node according to the second set of routing constraints different from the first set of routing constraints; and
identifying the third node based on an intersection of the first set of compute nodes and the second set of compute nodes.

12. A method, comprising:
at a server system having a plurality of compute nodes, at each compute node:
generating a first set of routes to a first subset of compute nodes of the plurality of compute nodes based on a first set of routing constraints comprising a first dimension-ordered routing constraint;
generating for a second subset of compute nodes of the plurality of compute nodes that are unreachable based on the first set of routing constraints, a second set of routes based on a second set of routing constraints comprising a second dimension-ordered routing constraint associated with different from the first dimension-ordered routing constraint; and
routing received messages to others of the plurality of compute nodes via a fabric interconnect based on the first set of routes and the second set of routes, wherein the first set of routing constraints comprises dimension-ordered routing according to a first dimension order and the second set of routing constraints comprises dimension-ordered routing according to a second dimension order different from the first dimension order.

13. The method of claim 12, wherein generating the first set of routes comprises:
at a first compute node of the plurality of compute nodes:
identifying a second compute node of the plurality of compute nodes as unreachable according to the first set of routing constraints;
in response to identifying the second compute node as unreachable, identifying a third compute node that is reachable according to the first set of routing constraints, wherein the second compute node is reachable from the third compute node according to the first set of routing constraints; and
routing a message from the first compute node to the second compute node via the third compute node.

14. The method of claim 13, wherein identifying the third compute node comprises:
identifying a first set of compute nodes that are reachable from the first node according to the first set of routing constraints;
identifying a second set of compute nodes that are reachable from the second node according to the second set of routing constraints different from the first set of routing constraints; and
identifying the third node based on an intersection of the first set of compute nodes and the second set of compute nodes.

15. The method of claim 14, wherein:
the intersection of the first set of compute nodes and the second set of compute nodes comprises a plurality of intermediate nodes; and
selecting the third node from the plurality of intermediate nodes based on a cost metric selected from the group consisting of: a number of hops between the first compute node and the third compute node, a number of hops between the third compute node and the second compute node, a congestion between the first compute node and the third compute node, and a congestion between the third compute node and the second compute node.

16. The method of claim 13, wherein identifying the second compute node as unreachable is based on an error at a link of the fabric interconnect between the first compute node and the second compute node.

17. The method of claim 13, wherein identifying the second compute node as unreachable is based on an amount of congestion at a link of the fabric interconnect between the first compute node and the second compute node.

* * * * *